US005522956A

United States Patent [19]

McCannel

[11] Patent Number: 5,522,956

[45] Date of Patent: Jun. 4, 1996

[54] CARD-CARRYING SHEETS, PROCESS OF MAKING AND METHOD OF USING THE SAME

[76] Inventor: Duncan McCannel, 3615 Great Oaks Cir., Eagan, Minn. 55123

[21] Appl. No.: 375,430

[22] Filed: Jan. 19, 1995

Related U.S. Application Data

[62] Division of Ser. No. 185,677, Jan. 24, 1994, abandoned.

[51] Int. Cl.[6] .................................................... B32B 31/18

[52] U.S. Cl. ......................... 156/209; 156/256; 156/265; 156/293

[58] Field of Search .................................. 156/293, 256, 156/263, 265, 209, 219

[56] References Cited

U.S. PATENT DOCUMENTS

| | | | |
|---|---|---|---|
| 2,511,859 | 6/1950 | Langan | 235/487 |
| 2,512,106 | 6/1950 | Langan | 283/117 X |
| 2,587,022 | 2/1952 | Langan | 40/159.2 X |
| 2,977,017 | 3/1961 | Herzig | 156/219 X |
| 3,212,412 | 10/1965 | Langan et al. | 159/209 X |
| 3,697,101 | 10/1972 | Loos et al. . | |
| 3,758,970 | 9/1973 | Annenberg . | |
| 3,773,511 | 11/1973 | Anderson | 40/159.2 X |
| 3,959,907 | 6/1976 | Anderson | 40/159 |
| 3,981,092 | 9/1976 | Ramsdale | 40/158.1 |
| 4,379,573 | 4/1983 | Lomeli et al. . | |
| 4,447,481 | 5/1984 | Holmberg et al. . | |
| 4,468,912 | 9/1984 | Lewis et al. | 53/137 |
| 4,491,495 | 1/1985 | Muscoplat . | |
| 4,525,116 | 6/1985 | Holmberg . | |
| 4,551,374 | 11/1985 | Holmberg . | |
| 4,590,109 | 5/1986 | Holmberg . | |
| 4,618,520 | 10/1986 | Holmberg . | |
| 4,854,610 | 8/1989 | Kwiatek . | |
| 4,863,195 | 9/1989 | Capozzola . | |
| 4,883,554 | 11/1989 | Bida . | |
| 4,887,763 | 12/1989 | Sano . | |
| 4,890,862 | 1/1990 | Buchholz . | |
| 4,910,058 | 3/1990 | Jameson . | |
| 4,982,894 | 1/1991 | Schmidt | 283/75 X |
| 5,096,229 | 3/1992 | Carlson . | |
| 5,098,759 | 3/1992 | Felix . | |
| 5,131,686 | 7/1992 | Carlson . | |
| 5,183,436 | 2/1993 | Shanley | 462/6 |
| 5,219,183 | 6/1993 | McKillip . | |
| 5,232,147 | 8/1993 | Weinzierl et al. . | |
| 5,238,720 | 8/1993 | Volkman | 283/81 X |
| 5,271,792 | 12/1993 | Gaetano | 156/108 |
| 5,320,387 | 6/1994 | Carlson | 283/107 X |
| 5,403,236 | 4/1995 | Greig | 283/74 X |

OTHER PUBLICATIONS

Prior art card–carrying sheet identified in Figure 5—Hagen VIC Card.

Business Forms, Labels & Systems, Jul. 1993, pp. 22, 44, 56 & 84.

*Primary Examiner*—Frances Han

*Attorney, Agent, or Firm*—Merchant, Gould, Smith, Edell, Welter & Schmidt

[57] ABSTRACT

A card-carrying sheet having a removable card incorporated therein and having a substantially uniform thickness. The card-carrying sheet includes a carrier sheet having a window region and recessed region surrounding the window region, a removable card in the window region and adhesive tape holding the removable card in place. The card-carrying sheet is well suited for use in a laser printer.

14 Claims, 3 Drawing Sheets

CARD-CARRYING SHEETS, PROCESS OF MAKING AND METHOD OF USING THE SAME

This is a divisional of application Ser. No. 08/185,677, filed Jan. 24, 1994 now abandoned.

FIELD OF THE INVENTION

The present invention relates to a card-carrying sheet having a removable card incorporated therein and having a substantially uniform thickness.

BACKGROUND OF THE INVENTION

Wallet-size cards are widely used as identification cards, membership cards, insurance cards, index cards, licenses, tags and the like. Therefore, it is desirable to prepare and distribute such cards in mass quantities. However, because of their small size they cannot be processed in standard laser, lithographic or other high-speed printers, mail processing equipment and other equipment designed to handle high volumes of paper.

One technique for dealing with this problem involves simply adhering or attaching cards to standard size paper which can then be fed into printers. FIG. 5 shows a prior art card-carrying sheet for use in a conventional impact printer having tractor drive wheels which engage perforated strips on the sides of the paper (not shown) to provide the necessary indexing and control for feeding the paper. Card 50 is adhered to carrier sheet 51 by adhesive tape 52 which forms a ridge of increased thickness. However, this ridge can cause the sheet to jam in modern high-volume paper processing equipment. For example, many modern high speed printers detect the height of a stack of papers in a holding bin and if one portion of the stack is ¼" higher than another portion, the papers will not feed into the printer. Thus, a large stack of the above card-carrying sheets will not feed into such printers since the increased thickness caused by the adhesive tape is amplified through the stack. In addition, some laser printers are finicky and unable to handle varying thicknesses of paper on the same sheet. Thus, the ridge created by the adhesive tape can cause the imaging mechanisms to fall out of alignment, resulting in misaligned and poor quality imaging. Accordingly, it is desirable to provide a card-carrying sheet having a removable card incorporated therein and having a substantially uniform thickness.

One attempt at providing such a product involves laminating plastic over a portion of a first sheet of paper, adhering a second sheet of paper over most or all of the first sheet of paper which is not covered by plastic and die-cutting a perforated card from the laminated portion. See U.S. Pat. No. 5,096,229 to Carlson. Perforations in the plastic can cause a jagged edge on the resulting card which can puncture skin. In many applications, a plastic laminated paper card is not sufficiently resistant to delamination. The entire sheet prepared according to the above patent is laminated with either plastic or paper which increases cost.

Another attempt involves recessing an area of a sheet of paper, laminating a plastic film over the recessed area and die-cutting a perforated card from the laminated portion. See U.S. Pat. No. 5,131,686 to Carlson. This technique eliminates the need for adhering another sheet over the nonlaminated portion to achieve a substantially flat sheet. However, a similar plastic laminated paper card can be produced having a jagged edge and not being sufficiently resistant to delamination. In addition, when processed through the feeding mechanisms in a laser printer, the perforations may be too weak to hold the card in place. Accordingly, it is desirable that a card-carrying sheet having a substantially uniform thickness incorporates a high quality plastic card therein which will not separate from the sheet during processing but can be easily pealed away by human fingers.

SUMMARY OF THE INVENTION

A card-carrying sheet which can be used in high-volume sheet processing equipment, such as laser printers and lithographic printers, is provided by the present invention. The card-carrying sheet includes a carrier sheet surrounding at least one window region and having a recessed region adjacent thereto having a thickness generally smaller than the remainder of the carrier sheet, a removable card located within the window region, and adhesive tape at least a portion of which is adhering the removable card to the recessed region of the carrier sheet. Preferably, the recessed region is compressed to a depth equivalent to the thickness of the adhesive tape, and the thickness of the removable card is equivalent to the thickness of the carrier sheet at the recessed region. Thus, the card-carrying sheet has a substantially uniform thickness. However, slight variations in thickness can be endured before effecting the performance of the card-carrying sheet.

The carrier sheet component can be made of any material capable of being compressed and can be any size capable of being fed into high-volume sheet processing equipment. Usually, the carrier sheet is normal size business paper which can be printed upon. The window region in the carrier sheet has dimensions slightly larger than the dimensions of the card which is located therein.

The card can be any size convenient for use in a wallet, pocket, purse, glove compartment and the like, and should be capable of bearing information such as printing. The card can be made of any material capable of withstanding the temperatures encountered during laser printing and having the desired durability and flexibility properties. Preferably, the card is made of polyvinyl chloride.

Any adhesive tape capable of withstanding the temperatures and stresses involved in laser printing can be used as a means for attaching the removable card to the recessed region in the carrier sheet. Preferably, the adhesive tape can secure the card to the recessed region in the carrier sheet during processing steps such as those encountered during laser printing but can release the card when human fingers peal the card away. The adhesive tape can cover an entire surface of the card, such as the back surface of the card, but it is preferred that the adhesive tape only contacts the peripheral edge of the card so that the card can receive printing on both sides when processed in a laser printer.

A process for preparing a card-carrying sheet which can be processed in high-volume sheet processing equipment, such as laser printers, is provided by the present invention. The process involves compressing an area of a carrier sheet to form a recessed region having a thickness which, when layered with an adhesive tape, does not create a combined thickness substantially greater than the remainder of the carrier sheet; removing a section from the carrier sheet to form a window region adjacent to at least a portion of the recessed region; placing a removable card within the window region of the carrier sheet; and applying adhesive tape over both the removable card and the recessed region. If desired, the steps of compressing an area of a carrier sheet to form a recessed region and removing a section from the carrier sheet to form a window region can be interchanged so that the window region is formed before the carrier sheet is compressed.

A process for using the card-carrying sheet is provided by the present invention. The process involves feeding a card-carrying sheet described above into a high-volume paper processing machine, such as a laser printer. Preferably, the card-carrying sheet is drawn from a stack of other card-carrying sheets.

DETAILED DESCRIPTION OF THE INVENTION

Figure 1:
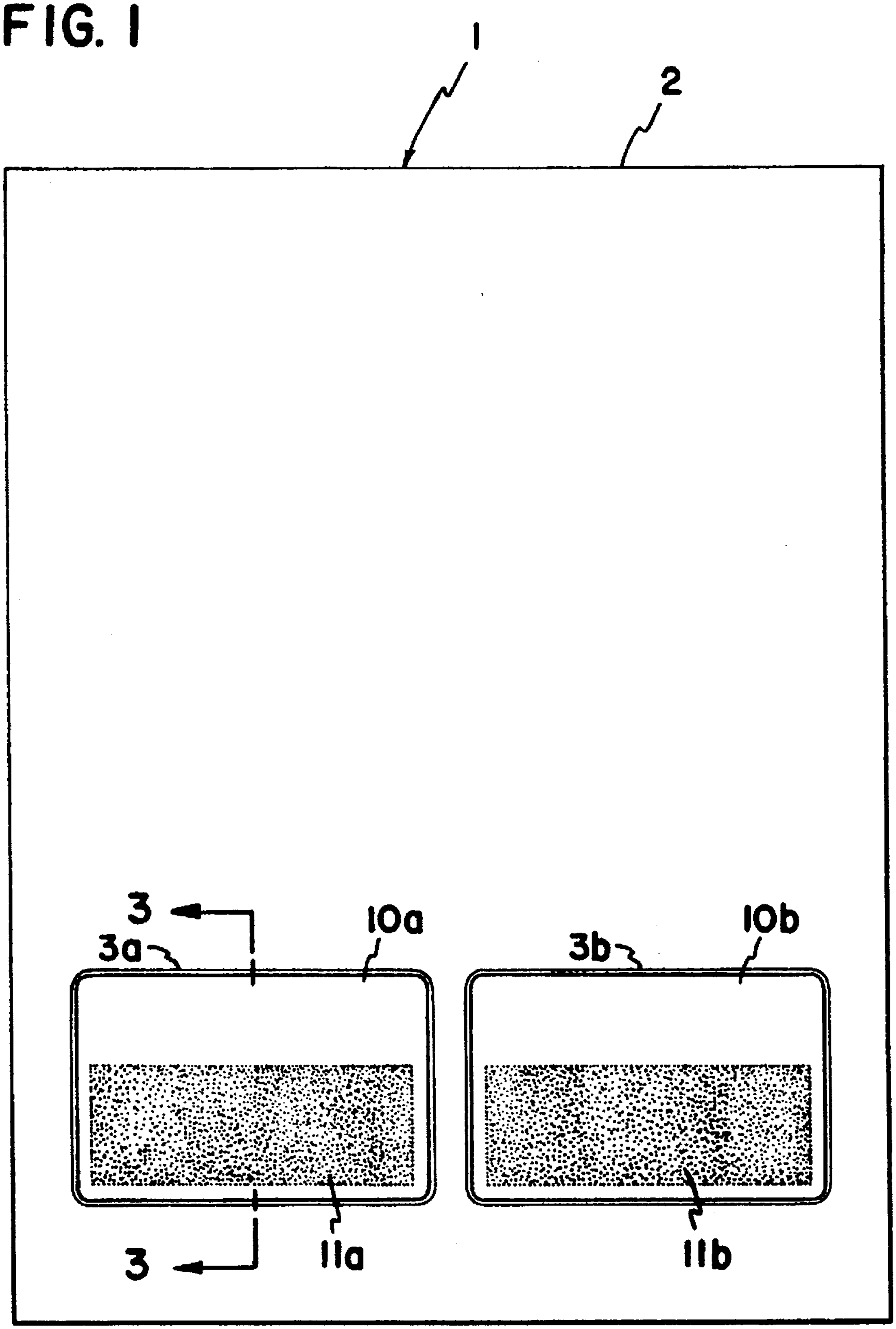
FIG. 1 is a front view of a card-carrying sheet according to the principles of the present invention.

One preferred embodiment of the invention will be described in detail with reference to the drawings, wherein like reference numerals represent like parts and assemblies throughout the several views. Reference to the preferred embodiment does not limit the scope of the invention, which is limited only by the scope of the claims attached hereto.

Figure 2:
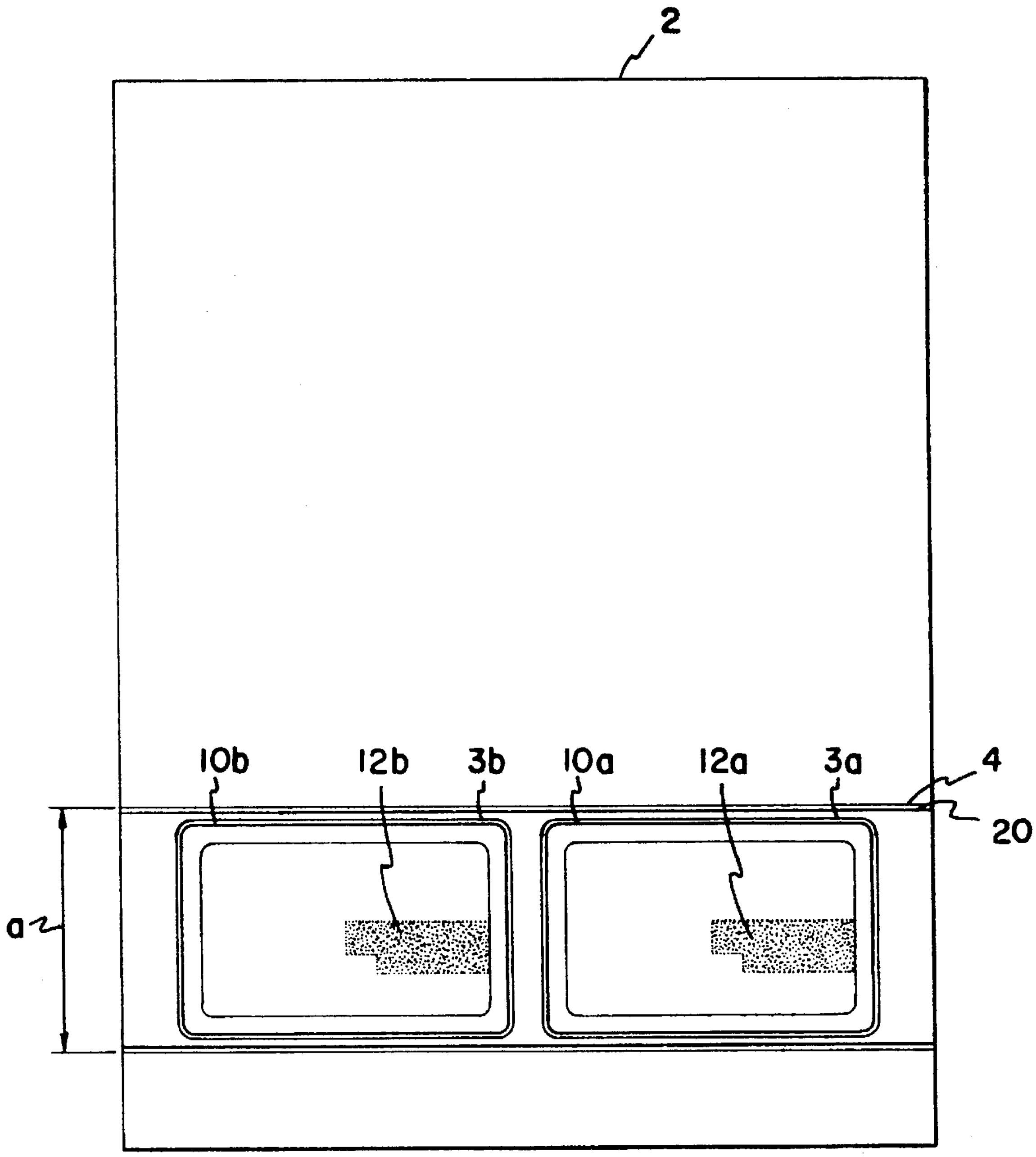
FIG. 2 is a rear view of the card-carrying sheet.
Figure 3:
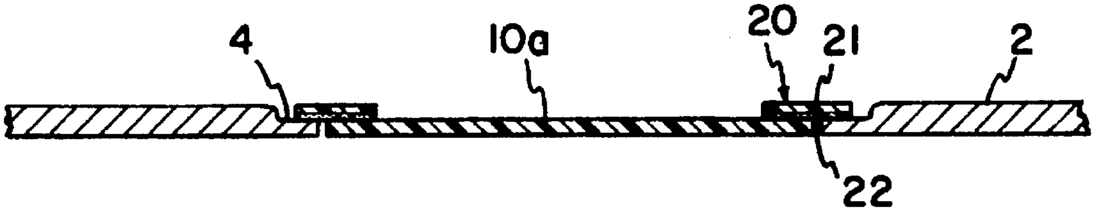
FIG. 3 is a sectional view, with thickness exaggerated, taken along line 3—3 of FIG. 1.

Referring to FIGS. 1–3, a card-carrying sheet in accordance with this invention is illustrated generally at 1. Card-carrying sheet 1 contains two separable cards 10*a*, 10*b* located in window regions 3*a*, 3*b*, respectively, and attached to recessed region 4 in carrier sheet 2 by adhesive tape 20. The combined thickness of adhesive tape 20 and cards 10*a*, 10*b* is substantially equivalent to the combined thickness of adhesive tape 20 and recess 4 which is substantially equivalent to the thickness of carrier sheet 2. For most applications, no part of card-carrying sheet 1 is thicker than the thickness of the nonrecessed portion of carrier sheet 2.

Card-carrying sheet 1 can have any dimension which allows it to be used in a laser printer or other high-volume printer. Preferably, the sheet is the size of a business letter.

Carrier sheet 2 is made of 10 point paper which is commercially available as index paper produced, for example, by Scott Paper Corporation. Another type of paper which can be used includes index paper. However, any other paper or paper substitute capable of being compressed can be used according to the present invention. The thickness of the paper or paper substitute can be chosen depending upon the depth of compression and the thickness of the adhesive tape and removable card according to the teachings of the present invention.

Window regions 3*a*, 3*b* can be cut from carrier sheet 2 using a die-cutting apparatus as generally known in the art. Alternatively, the window regions can be cut using any other known technique. The dimensions of window regions 3*a*, 3*b* should be slightly larger than the dimensions of removable cards 10*a*, 10*b* which are located within window regions 3*a*, 3*b*, respectively, of card-carrying sheet 1. It is preferable that each window region is completely surrounded by the carrier sheet as shown in FIG. 1. However, it is within the scope of the present invention to place a window region in a corner or side of the carrier sheet so that it is only partially surrounded by the carrier sheet.

Recessed region 4 in carrier sheet 2 can be formed by calendering carrier sheet 2 using a large stainless steel ball bearing having a width approximately equivalent to dimension a. A suitable apparatus for forming recessed region 4 is described in U.S. Pat. No. 4,447,481 to Holmberg, et al. Other apparatuses capable of compressing paper or paper substitutes can similarly be used. Carrier sheet 2 is generally compressed to a depth equal to or greater than the thickness of the adhesive tape 20 applied thereto. For example, FIG. 3 shows a cross section of card-carrying sheet 1 along line 3—3 in FIG. 1 wherein the thickness is exaggerated. Removable card 10a is located within window region 3*a* and is adhered to recessed region 4 by adhesive tape 20 having film component 21 and adhesive component 22. The thickness of removable card 10*a* is substantially equivalent to the thickness of recessed region 4. The combined thickness of removable card 10*a* and adhesive tape 20 is substantially equivalent to the thickness of the non-recessed portions of carrier sheet 2. Slight variations in thicknesses can be endured before affecting the performance of the card-carrying sheet.

In the preferred embodiment the depth of recessed region 4 is about 0.002" which is about the thickness of adhesive tape 20. However, if an adhesive tape having a thickness of 0.001" is used to secure the card to the carrier sheet, then the recessed region should be compressed to a depth of only by about 0.001". Preferably, the adhesive tape is as thin as possible while providing sufficient adherence properties. Regardless of the specific dimensions, it is desirable that the thickness of the entire card-carrying sheet is substantially uniform. Thus, the card-carrying sheet should be capable of being fed into a laser printer without jamming the feeding mechanisms or causing the imaging mechanisms to fall out of alignment.

Any suitable adhesive and film capable of withstanding the heat associated with laser printing or other high-volume printing or processing equipment can be used according to the present invention. Exemplary adhesives include latex and polyethylene. The adhesive can be a removable adhesive produced by H.B. Fuller Comapny or National Starch and Chemical. Exemplary films include cellulose acetate, polyester, polypropylene and onion skin/crate paper. If desired, the adhesive tape can be prefabricated and stored prior to use.

Removable cards 10*a*, 10*b* can be made of any material that will withstand the heat involved in being processed through a laser printer or other high-volume sheet processing equipment which works best with sheets of uniform thickness, and which has the desired properties of durability, rigidity, and flexibility. The cards should have smooth edges. Preferably, the cards are made of a single plastic material, such as polyvinyl chloride. However, blends and laminates including other plastic materials such as polystyrene, polypropylenes, polyolefins, polyesters such as polyethylene terephthalate and the like can be used. Preferably, the cards should not be made of laminated paper.

Figure 4:
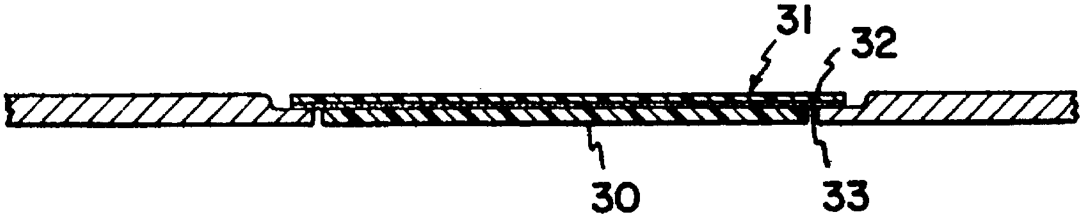
FIG. 4 is a sectional view of an alternative embodiment of the present invention wherein the card-carrying sheet has adhesive tape extending across one side of the card.
Figure 5:
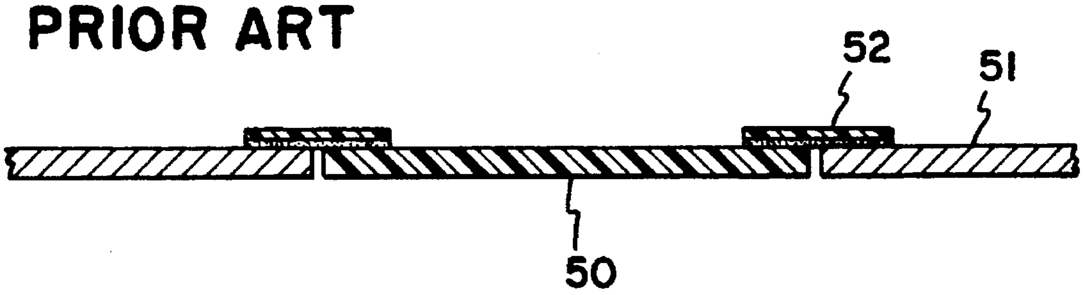
FIG. 5 PRIOR ART
FIG. 5 is a sectional view of a prior art card-carrying sheet.

It is to be understood that the term "card" as used herein and in the appended claims is intended to include any document of convenient size and shape which can be used as an identification card, membership card, security card, credit card, license, index card in an organizer such as a "ROLODEX" organizer, insurance card, tag and the like. Preferably, the card has a size which can be stored in a wallet, purse, glove compartment and the like. The card should be capable of bearing information such as printed information, magnetic information, optical information or similar information. Preferably, the card can be printed upon in a laser printer. In addition, it is preferable that the card can be printed on both sides while a part of the card-carrying sheet. However, FIG. 4 shows an alternative embodiment of the present invention wherein adhesive tape 31 is applied across one entire side of removable card 30. Thus, removable card 30 can only be printed on one side while a part of the card-carrying sheet.

While the preferred embodiment of the card-carrying sheet is provided with two removable cards, it is to be understood that the invention may be practiced using only a single card, or more than two cards. If the card-carrying sheet is in the form of a roll of paper, it may have hundreds or thousands of cards incorporated therein.

Card-carrying sheet 1 can be produced by compressing an area of carrier sheet 2 to form recessed region 4, and window regions 3*a*, 3*b* can be cut from carrier sheet 2 using a die-cutting apparatus. However, if desired, window regions 3*a*, 3*b* can be cut from carrier sheet 2 prior to compressing carrier sheet 2 to form recessed region 4. Recessed region 4 can be formed by compressing carrier sheet 2 to any desirable depth. However, the depth should be substantially equivalent to the thickness of the adhesive tape so as to provide a card-carrying sheet having a substantially uniform thickness. Removable cards 10*a*, 10*b* are then placed in window regions 3*a*, 3*b*, respectively, of carrier sheet 2. Adhesive tape 20 secures removable cards 10*a*, 10*b* to recessed region 4 of carrier sheet 2. Removable cards 10*a*, 10*b* can include print-receiving areas 11*a*, 11*b* on the front side and print-receiving areas 12*a*, 12*b* on the rear side.

The card-carrying sheet according to the present invention can be fed into a high-volume paper processing machine, such as a laser, lithographic or other high speed printer, or photocopier and the like. The card-carrying sheet can be fed singly or can be combined in a stack. Advantageously, many card-carrying sheets are stacked in a holder, such as a holding bin, and individual sheets are drawn therefrom.

While the invention has been described in conjunction with a specific embodiment thereof, it is evident that different alternatives, modifications, variations, and uses will be apparent to those skilled in the art in view of the foregoing description. Accordingly, the invention is not limited to these embodiments or the use of elements having specific configurations and shapes as presented herein.

What is claimed is:

1. A process for preparing a card-carrying sheet comprising the steps of:

(a) compressing an area of a carrier sheet to form a recessed region having a thickness which, when layered with an adhesive tape, does not create a combined thickness substantially greater than the remainder of the carrier sheet;

(b) removing a section from the carrier sheet to form a window region adjacent to at least a portion of the recessed region;

(c) placing a removable card within the window region of the carrier sheet; and (d) applying adhesive tape over both the removable card and the recessed region.

2. The process according to claim 1, wherein the process step of compressing an area of a carrier sheet to form a recessed region occurs prior to the process step of removing a section from the carrier sheet to form a window region.

3. The process according to claim 1, wherein the section of carrier sheet is removed by die-cutting.

4. The process according to claim 1, wherein the removable card is made of a material capable of withstanding heat involved in being processed through a laser printer or other high-volume sheet processing equipment.

5. The process according to claim 1, wherein the removable card is made from a material selected from the group consisting of polyvinyl chloride, polypropylene, polyolefin, polyesters, and mixtures thereof.

6. The process according to claim 1, wherein the polyester is polyethylene terephthalate.

7. The process according to claim 1, wherein the removable card is made of polyvinyl chloride.

8. The process according to claim 1, wherein the carrier sheet is paper.

9. The process according to claim 1, wherein the removable card can be printed on both sides in a laser printer while adhered to the adhesive tape.

10. The process according to claim 1, wherein the adhesive tape provides sufficient adhesion to secure the removable card to the carrier sheet during laser printing and allows the removable card to be removed when peeled away by human fingers.

11. The process according to claim 1, wherein the removable card is a wallet-size card.

12. The process according to claim 1, wherein the removable card is an identification card.

13. The process according to claim 1, wherein the removable card is an insurance card.

14. The process according to claim 1, wherein the removable card is a membership card.

* * * * *